United States Patent [19]

Iwamoto et al.

[11] Patent Number: 4,683,403
[45] Date of Patent: Jul. 28, 1987

[54] DIMMER PASSING DEVICE FOR HEADLAMP OF VEHICLE

[75] Inventors: Tadashi Iwamoto; Toshiki Ikeda; Kazuo Yukitomo, all of Hiroshima; Masaichi Hattori, Aichi; Kaneyasu Arakawa, Aichi; Koichi Kihira, Aichi; Akira Hanaki, Aichi, all of Japan

[73] Assignee: Mazda Motor Corporation, Aichi, Japan

[21] Appl. No.: 886,404

[22] Filed: Jul. 17, 1986

[30] Foreign Application Priority Data

Jul. 24, 1985 [JP] Japan ............................ 60-113500[U]

[51] Int. Cl.$^4$ ............................................. B60Q 1/02
[52] U.S. Cl. .................................. 315/83; 307/10 LS; 315/82
[58] Field of Search ................. 315/82, 83; 307/10 LS

[56] References Cited

U.S. PATENT DOCUMENTS 2,571,981 10/1951 Wensel .................................. 315/83
3,671,802 6/1972 Ballou .................................. 315/83

Primary Examiner—Harold Dixon
Attorney, Agent, or Firm—Finnegan, Henderson, Farabow, Garrett and Dunner

[57] ABSTRACT

There is provided a dimmer passing device for a headlamp of a vehicle having a light switch which drives a light relay when it is on, a momentary control switch which activates the light relay when it is on, a latch circuit which alternately turns on and off an internal switching element in response to the on state of the momentary control switch, and a dimmer relay which causes the light relay to energize a low beam of the headlamp when the internal switching element is turned off and which causes the light relay to energize a high beam of the headlamp when the internal switching element is turned on.

4 Claims, 1 Drawing Figure

DIMMER PASSING DEVICE FOR HEADLAMP OF VEHICLE

BACKGROUND OF THE INVENTION

1. Field of the Invention

The present invention relates to a dimmer passing device for a headlamp of a vehicle and more particularly to a dimmer passing device offering dimmer control intended to reduce the intensity of the light of the headlamp and offering a passing control designed to blink the headlamp when passing.

2. Prior Art

Vehicular dimmer passing devices of the type described above have previously included a momentary switch for dimmer passing control wherein a control switch was used to switch the high beam state of a headlamp over to the low beam state alternately every time the switch was operated. However, such a control switch has employed a mechanical latch mechanism, which resulted in a slower control stroke and thus, poor control sensitivity. The latch mechanism was relatively complicated in construction and disadvantageous in that it was unreliable for long-term use. Another problem was that the latch mechanism required a relatively large area for installation, thus restricting freedom in design of the overall device and resulting in a control switch which required a large amount of space to implement.

SUMMARY OF THE INVENTION

In view of the foregoing, it is an object of the present invention to provide a dimmer passing device offering enhanced control sensitivity, improved reliability and which utilizes less space for its installation resulting in a greater amount of freedom in designing the configuration of the device.

Additional objects and advantages of the invention will be set forth in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the dimmer passing device of this invention comprises a light switch operable selectively to an on and off state; a momentary control switch operable selectively to an on and off state; a light relay operative when driven for energizing one of a low beam portion and a high beam portion of the headlamp; first circuit means connecting the light relay to the light switch for activating the light relay in response to the on state of the light switch; second circuit means connecting the light relay to the momentary control switch for activating the light relay in response to the on state of the momentary control switch; latch circuit means including an internal switching element operative to alternately turn on and off the internal switching element in response to the on state of the momentary control switch; a dimmer relay operative to a first position for causing the light relay to energize the low beam portion and operative to a second position for causing the light relay to energize the high beam portion; and third circuit means for operating the dimmer relay to the second position at times when the internal switching element is in the on state, and for operating the light relay to energize the low beam portion at times when the dimmer relay is operated to the first position and the internal switching element is in the off state.

DETAILED DESCRIPTION OF THE PREFERRED EMBODIMENT

Figure 1:
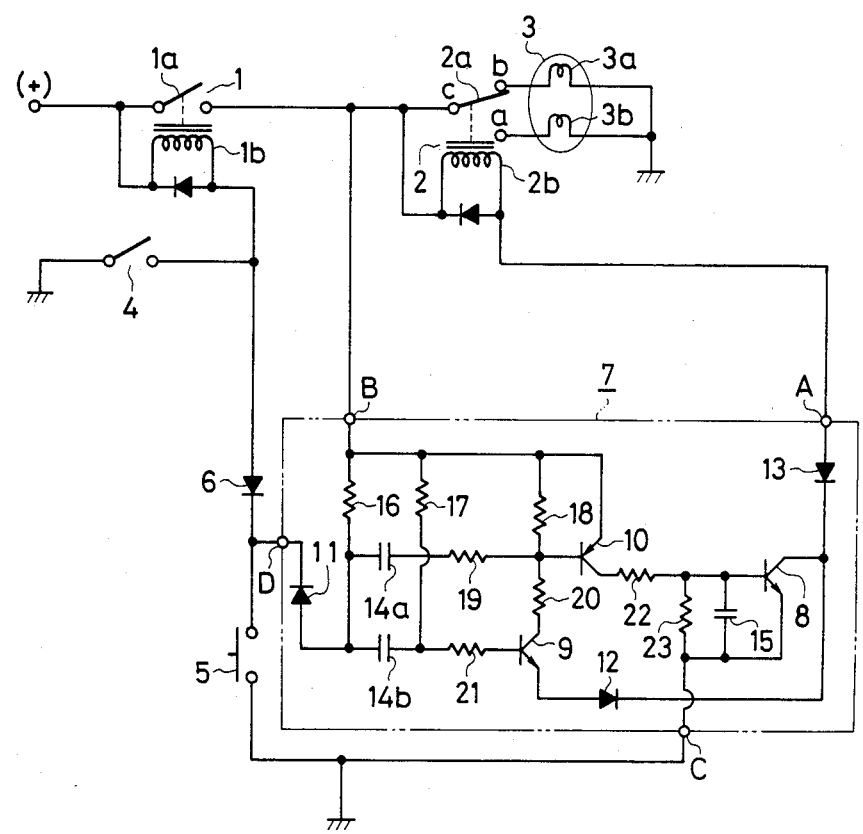
FIG. 1 is an electric circuit diagram illustrating the dimmer passing device constructed in accordance with a preferred embodiment of the present invention.

Reference will now be made in detail to the present preferred embodiment of the invention, an example of which is illustrated in the accompanying drawing.

In FIG. 1, there is shown an electric circuit comprising a light relay 1 having a normally open relay switch 1a, a dimmer relay 2 having a transfer relay switch 2a, and a headlamp 3 having a low beam filament 3a and a high beam filament 3b. The low beam filament 3a is energized by a voltage from a positive power supply terminal (+) of a battery through the relay switch 1a and contacts (c-b) on the normally closed side of the relay switch 2a, whereas the high beam filament 3b is energized through the relay switch 1a and contacts (c-a) on the normally open side of the relay switch 2a.

The circuit further comprises a light switch 4 arranged so that an exciting coil 1b of the light relay 1 is energized and de-energized interlockingly with the on and off states of the light switch 4; a momentary control switch 5 having a single make contact, with one end connected to a ground terminal and another end connected to the positive supply terminal (+) through a diode 6 and the exciting coil 1b; a latch circuit 7 having an npn transistor 8 which functions as a switching element, an npn transistor 9, a pnp transistor 10, diodes 11, 12 and 13, capacitors 14a, 14b, and 15, and resistors 16, 17, 18, 19, 20, 21, 22, and 23.

As shown in FIG. 1, terminal A is connected to the positive power supply terminal (+) through an exciting coil 2b of the dimmer relay 2 and the relay switch 1a of the light relay 1. Terminal B is connected to the positive power supply terminal (+) through the relay switch 1a. Terminal C is connected to the ground terminal. And terminal D is connected to the node between the control switch 5 and the diode 6. In the latch circuit 7, the capacitances of each of the capacitors 14a, 14b and the resistances of each of the resistors 16–20 are set so that a time constant for charging and discharging the capacitor 14b is, for example, about 10 times as great as a time constant for charging and discharging the capacitor 14a.

The operation of the circuit shown in FIG. 1 will now be described. When the light switch 4 is turned on, the exciting coil 1b of the light relay 1 is energized thereby turning on the relay switch 1a. When the light switch 4 is turned on first, the exciting coil 2b of the dimmer relay 2 remains de-energized and the contacts (c-b) of the relay switch 2a remain closed because the transistor 8 in the latch circuit 7 is off. As a consequence, the low beam filament 3a of the headlamp 3 is energized and the headlamp 3 produces a low beam of light.

If the control switch 5 is turned on while the headlamp 3 is in a low beam state, the transistor 10 is turned on by the charging current flowing into the capacitor 14a through the resistors 18 and 19. The transistors 8 and 9 are then successively turned on and, when the transistor 9 is thus turned on, the transistors 10 and 8 are held on even after the control switch 5 is turned off. Consequently, the exciting coil 2b of the dimmer relay 2 is energized through the relay switch 1a of the light relay 1 and the transistor 8 and the contacts (c-a) of the relay switch 2a of the dimmer relay 2 are closed. The high beam filament 3b of the headlamp 3 is then energized and the headlamp 3 produces a high beam of light.

However, after the control switch 5 is turned off, the capacitors 14a and 14b are oppositely charged in polarity (each having a positive potential on the diode 11 side). Accordingly, if the control switch 5 is then turned on while the headlamp 3 is in a high beam state, the capacitor 14b is caused to have a negative potential on the resistor 21 side, which forces the transistor 9 to turn off, thus turning off the transistors 10 and 8 successively. As the exciting coil 2b of the dimmer relay 2 is de-energized, the contacts (c-b) of the relay switch 2a are closed and the headlamp 3 again produces a low beam of light. Since the time constant of charging and discharging the capacitor 14b is set to a greater value than that of the capacitor 14a, the capacitor 14a is charged through the resistors 18 and 19 while the transistor 9 is held off and the transistor 10 will not be turned on even if the control switch 5 is continuously held on. As a result, all of the transistors 8, 9, and 10 are restored to the off state in accordance with the on operation of the control switch 5.

As set forth above, the headlamp 3 is alternately caused to produce low and high beams of light every time the control switch 5 is turned on while the light switch 4 is held on. When the light switch 4 is turned off, the exciting coil 1b of the light relay 1 is de-energized and prevented from being driven and thus the relay switch 1a is opened. As a result, the headlamp 3 is turned off as the supply of power thereto is stopped, and the supply of power to the latch circuit 7 is also stopped. The transistors 8, 9, and 10 are thereby returned to the off state.

In the alternative, if the control switch 5 is operated and held on while the light switch 4 is held off, the exciting coil 1b of the light relay 1 is energized through the control switch 5 and the diode 6, and the relay switch 1a is turned on. Simultaneously, the transistors 8, 9, and 10 in the latch circuit 7 are turned on as described above and the exciting coil 2b of the dimmer relay 2 is energized, thereby closing the contacts (c-a) of the relay switch 2a. The high beam filament 3b of the headlamp 3 is energized and the headlamp 3 produces a high beam of light. This operation produces the passing control, i.e., the headlamp 3 is caused to blink by repeating the turn-on operation of the control switch 5.

In the above embodiment, the latch circuit 7 and the dimmer relay 2 are employed in place of a conventional control switch equipped with a latch mechanism. The invention also utilizes the control switch 5 which has a contact switching function with a fast control stroke, thereby improving the control sensitivity as compared with the conventional device. Since no mechanical component such as a latch mechanism is employed, the reliability of the device for long-term use is improved. As the dimmer relay 2 itself is relatively small in area and can be constructed separately from the latch circuit 7, the overall device requires a small area for installation and allows for greater freedom in design in its construction. Another advantage of the present invention is that the headlamp 3 will produce the low beam of light when the light switch 4 is turned on and a driver in a car in the opposite lane will be prevented from feeling any unprepared blindness. And since the headlamp 3 will produce a high beam of light during the passing operation, an improved passing function is always obtained.

As is obvious from the above description, the dimmer passing device for a vehicular headlamp provides practical and useful results including improved control sensitivity and reliability and greater freedom in designing the configuration of such a dimmer passing device.

It will be apparent to those skilled in the art that various modifications and variations can be made in the dimmer passing device of the present invention without departing from the spirit and scope of the invention. Thus, it is intended that the present invention cover the modifications and variations of this invention provided they come within the scope of the appended claims and their equivalents.

What is claimed is:

1. A dimmer passing device for a headlamp of a vehicle comprising:
    a light switch operable selectively to an on and off state;
    a momentary control switch operable selectively to an on and off state;
    a light relay operative when driven for energizing one of a low beam portion and a high beam portion of said headlamp;
    first circuit means connecting said light relay to said light switch for activating said light relay in response to the on state of said light switch;
    second circuit means connecting said light relay to said momentary control switch for activating said light relay in response to the on state of said momentary control switch;
    latch circuit means including an internal switching element operative to alternately turn on and off said internal switching element in response to the on state of said momentary control switch;
    a dimmer relay operative to a first position for causing said light relay to energize said low beam portion and operative to a second position for causing said light relay to energize said high beam portion; and
    third circuit means for operating said dimmer relay to said second position at times when said internal switching element is in the on state, and for operating said light relay to energize said low beam portion at times when said dimmer relay is operated to said first position and said internal switching element is in the off state.

2. A dimmer passing device for a headlamp of a vehicle as claimed in claim 1, wherein said latch circuit is connected to restore said internal switching element from an on state to an off state at times when said light relay is de-energized.

3. A dimmer passing device for a vehicle comprising:
    a headlamp having a first filament for a high beam of light and second filament for a low beam of light;
    a relay operative when driven for energizing one of said first filament and said second filament;
    switch means for driving said relay;
    momentary control switch means for driving said relay only at times when said momentary control switch means is turned on;
    a latch circuit having an internal switching element alternately turning on and off at times when said momentary control switch means is turned on; and dimmer relay means for actuating said first filament for said high-beam of light when said internal switching element is turned on and while said relay is on, and for actuating said second filament for said low beam of light when said internal switching element is turned off.

4. A dimmer passing device as claimed in claim 3, wherein said internal switching element of said latch circuit is turned off when said relay is de-energized.

* * * * *

UNITED STATES PATENT AND TRADEMARK OFFICE
CERTIFICATE OF CORRECTION

PATENT NO. : 4,683,403

DATED : July 28, 1987

INVENTOR(S) : Tadashi Iwamoto et al.

It is certified that error appears in the above-identified patent and that said Letters Patent is hereby corrected as shown below: On the Title Page:

Change assignee from "Mazda Motor Corporation" to

--Mazda Motor Corporation and Kabushiki Kaisha Tokai Rika Denki Seisakusho-- of Hiroshima, Japan and Aichi, Japan respectively.

Signed and Sealed this

Twentieth Day of October, 1987

Attest:

DONALD J. QUIGG

*Attesting Officer*

*Commissioner of Patents and Trademarks*